Figure 1:
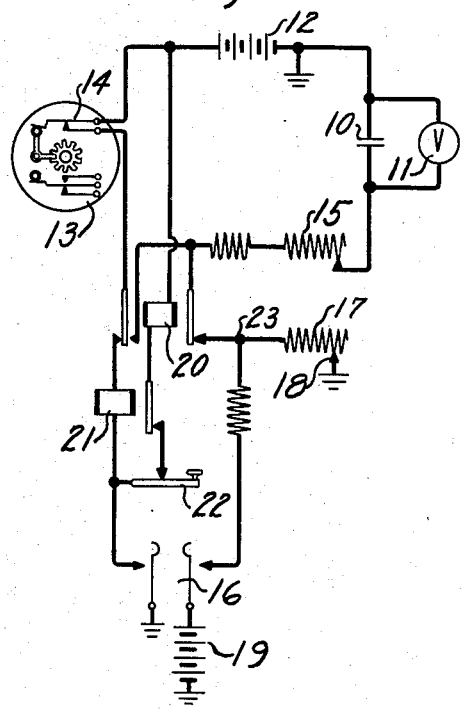

March 16, 1926.

O. R. MILLER

TESTING SYSTEM

Filed March 22, 1924

1,577,046

Inventor:
Ohmer R. Miller
by E. W. Adams, Atty.

Patented Mar. 16, 1926.

1,577,046

UNITED STATES PATENT OFFICE.

OHMER R. MILLER, OF BROOKLYN, NEW YORK, ASSIGNOR TO WESTERN ELECTRIC COMPANY, INCORPORATED, OF NEW YORK, N. Y., A CORPORATION OF NEW YORK.

TESTING SYSTEM.

Application filed March 22, 1924. Serial No. 701,004.

*To all whom it may concern:*

Be it known that I, OHMER R. MILLER, a citizen of the United States of America, residing at Brooklyn, in the county of Kings, State of New York, have invented certain new and useful Improvements in Testing Systems, of which the following is a full, clear, concise, and exact description.

This invention relates to a method and system for testing time intervals and particularly to the measuring of percentage of break to make of a circuit interrupting device such as the sending device used in automatic telephone systems.

An object of the invention is to provide a system that produces a quick and accurate indication of this operating characteristic when short trains of fast interruptions are tested as well as when longer trains of comparatively slow interruptions are under test.

Another object is to provide means in a system of this type for comparing a measured characteristic with any desired standard operating requirement.

This invention contemplates the use of a condenser and a voltmeter connected in parallel in a circuit containing a source of current and the contacts of which the percentage of make to break is to be measured. The alternate closing and opening of these contacts will, in a circuit of this type, cause the condenser to accumulate a charge or discharge through the voltmeter alternately and the voltmeter is so designed that the needle thereof will indicate the average charge on the condenser. This indication thus represents the percentage of make to break of the contacts under test and may be so read on the dial of the voltmeter. It is, however, evident that when short trains of interruptions are under test, the voltmeter needle will not respond with sufficient speed to secure an accurate reading before the interruptions have ceased. It is, therefore, a feature of this invention to provide a relay arrangement to cause the needle to assume a position before the test begins to represent a standard condition or to assume a position that is sufficiently close to the average charge to be produced by the contacts to be tested to permit the needle to quickly assume the correct position when the test begins. To this end, a balanced circuit is provided which is connected to the condenser and the voltmeter before the test begins so as to establish this average charged condition. If, now the percentage of make to break produced by the contacts under test is standard, the needle of the volmeter will remain practically stationary and an immediate reading will thus be obtained. On the other hand, in case the operating characteristics are not standard, the needle will swing in the direction corresponding to the average charge produced by the interruptions whether such interruptions are faster or slower than standard. The speed at which the needle responds, will, in such cases, depend on how near the measured characteristics are to the standard. In other words, with this arrangement the needle will occupy a position before the test begins which is in the vicinity of the position it will occupy when the test is made and thus comparatively quick readings of short trains of impulses may be secured.

Another feature of the invention is the provision of adjusting means for the balanced circuit so arranged that the needle may be set by repeated tests of the operating characteristics of a particular pair of interrupting contacts at the exact position representing the percentage of make to break of these contacts and thus an extremely accurate reading may be made of operating characteristics, regardless of the number of cycles of interruption.

Figure 3:
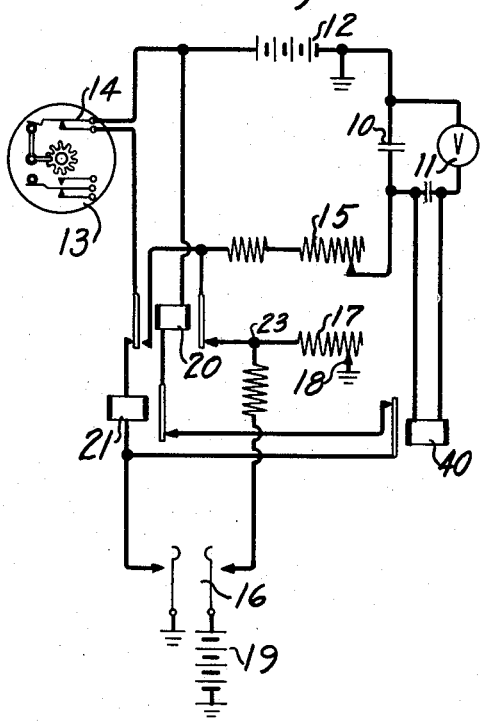
Figure 2:
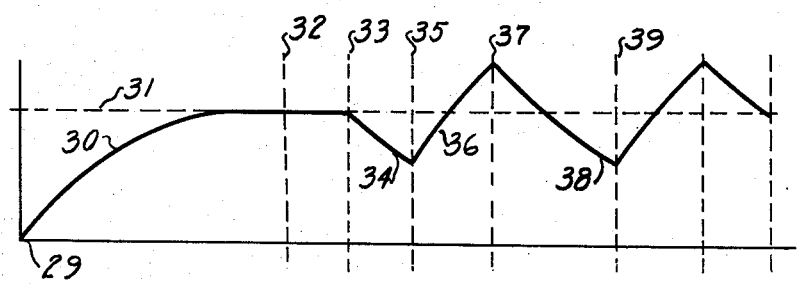

The invention may be described in connection with the accompanying drawing in which Fig. 1 represents a circuit arrangement by means of which the tests may be made; Fig. 2 represents a curve of the process involved, and Fig. 3 shows a modified form of the circuit for automatically setting the device for testing.

Referring now to Fig. 1, the testing circuit proper comprises a condenser 10, a voltmeter 11 in parallel therewith, a source of battery 12 and a dial 13 having interrupting contacts 14 in series therewith. A variable resistance 15 is also included in this circuit to regulate the time constant for charging the condenser, an expedient well known in the art. A key 16 is provided for connecting a source of battery and ground for the operation of the circuit shown, this key being normally open so as to prevent current drains when the device is not in use. The balanced circuit normally connected to the condenser 10 consists of a variable resistance 17 connected at one end to ground by the adjustable tap 18 and at the other end to the battery 19 through contacts of key 16. A relay 20 is provided to remove this balancing circuit from the condenser 10 and to connect the testing circuit in a manner hereinafter to be described. A second relay 21 and a start key 22 are also provided as shown for the purpose of starting the testing operations as will be hereinafter described.

The operation of this device is as follows: Key 16 is first permanently closed to ground and battery followed by a momentary operation of start key 22. The operation of key 16 connects the battery to the balanced circuit so that the condenser connected through contacts of relay 20 to the midpoint 23 of this circuit will receive a charge corresponding to the potential at this point. This charging circuit may be traced from the midpoint 23, right armature and back contact of relay 20, resistance 15, condenser 10, ground at battery 12. This charge on condenser 10 now represents the standard percentage of make to break required in senders such as 13. It should be observed that at the same time as this charging process takes place, the operation of key 16 and the momentary operation of key 22 has established a circuit for the energization of relay 21 as follows: grounded battery 12, interrupting contacts 14, left-hand armature and back contact of relay 20, winding of relay 21 to ground at the contacts of key 16. Relay 21 is operated and therefore prevents, at its armature and back contact, the operation of relay 20 at this time.

The circuit is now set for the testing of the interrupting contacts 14 to begin. If now the dial 13 is operated, the first break of contacts 14 releases relay 21 which in time causes relay 20 to operate from grounded battery 12, winding of relay 20, armature and back contact of relay 21, contacts of start key 22, contacts of key 16 to ground. The operation of relay 20 now closes the testing circuit at its left-hand armature and front contact and at its right-hand armature and back contact opens the circuit for condenser 10 to midpoint 23 of the balanced circuit. Condenser 10 now begins to discharge through the voltmeter 11 which would ordinarily if continued cause the needle thereof to swing towards its normal position. However, in the case where the percentage of break to make is standard no deflection of the needle will take place as the contacts 14 will again close before any appreciable discharge is effected. In this case, therefore, the condenser will begin to receive a charge equal to twice the amount of the discharge and the needle will consequently remain stationary. That is, if the contacts 14 are operating at the standard percentage of break to make, the needle will remain stationary partly due to its inherent sluggishness and partly due to the relative time and speed at which the charging and discharging may take place. This relation is not only dependent on the inherent characteristics of the apparatus employed but also on the adjustment of the resistance 15 which may be set to accommodate series standard percentage relations.

On the other hand, in case the operating characteristics of the contacts 14 are not standard, the position of the needle would be disturbed and the accumulative effect of an unstandard condition would be indicated by the needle. For example, if the percentage of make is larger than the standard, the condenser will have time to receive a proportionally greater charge and a correspondingly shorter time in which to discharge and the needle of the voltmeter will, therefore, show a gradually accumulating charge by a rising movement away from its original position. Should the condition be the reverse, that is, the closing time of the contacts 14 be less than the standard, the correspondingly gradual decreasing charge on the condenser would be affected and the needle swung toward normal position showing thereby the accumulative effect of the error in this direction. Thus, by setting the device in accordance with the above method, the operating characteristic of any sender may be quickly compared with a standard and the percentage of error accurately measured.

It is evident that by means of this device the exact percentage of make to break of a particular sender may be quickly ascertained even though a single break and make operation is tested. The manipulation of the device to perform this test will now be described. The procedure is the same as in testing for a standard condition with the difference that several tests have to be made. That is, at the first reading, the direction of error is noted on the volt-meter and then the device is adjusted until a test does not affect the position of the needle. If now the direction of error has been noted and before a second testing operation is begun, the resistance 17, when the midpoint 23 of this balanced circuit is connected to the condenser 10, is adjusted to produce an accumulated charge on the condenser 10 that will place the needle of the voltmeter as near as possible at the position it assumed during the first testing operation a repeated test will show how closely the new position of the needle was placed to the position it now occupies. This error is again noticed and the test is again repeated a number of times, each time adjusting the resistance 17 until finally no movement of the needle is noticed.

This final reading then will not only indicate the actual percentage of make to break of the sender under test but also the percentage of error as compared with the original standard operating requirement. The purpose of this repeated testing is to secure an immediate accurate response of the voltmeter to the condition of the operating characteristics of the contacts 14 when only a limited number of interruptions take place. In fact, by these means an accurate reading may be secured from a single cycle of operation, that is, the operating characteristics of the dial may be tested with the same accuracy when merely a single cycle of operations takes place as when a number of interruptions occurs. This accuracy cannot be obtained with an ordinary voltmeter and a simple interrupting circuit without the balanced circuit, as the needle of the voltmeter would at the first closing of such a circuit swing to a position indicating a full charge of the condenser 10 and when the first interruption takes place, the needle would not swing back to its proper position in time to indicate the true percentage of make to break before the completion of an operation of the dial, this being particularly true in case of a limited number of interruptions. A circuit arrangement, according to this invention, will, therefore, indicate with extreme accuracy the operating characteristics of a sender regardless of the number of cycles of interruptions tested.

To more clearly illustrate what is actually taking place in this circuit when the operating characteristics of the sender are ascertained, Fig. 2 has been prepared. Assuming then that point 29 represents the position at which the condenser 10 begins to receive a charge from the midpoint 23 of the balanced circuit and curve 30 when it has reached the level of line 31 represents the standard charge on the condenser from this circuit, the vertical line 32 may indicate the moment when the first separation of contacts 14 occurs while line 33 indicates the moment when relay 21 has released and relay 20 operated. At this moment condenser 10 begins to discharge through the voltmeter and the amount of the discharge is represented by the curve 34. When now the contacts 14 are closed, the condenser again begins to receive a charge and this moment of closure is indicated by line 35 and the charge received represented by the curve 36 which charge is twice the amount of the discharge in the case assumed. This charging of the condenser continues until contacts 14 again separate and this moment is indicated by line 37. The condenser now begins to discharge a second time and this discharge is represented by the curve 38. The distance between the line 37 and the line 39 indicates the period of break, if line 39 indicates the moment at which the contact again closes. These alternate discharges and charges are continued in this manner until the last interruption of the contacts 14. If, now, the amount of discharge as represented by curve 34 is equal to half that of the amount of charge as represented by curve 36 and the subsequent discharges and charges are equal and the voltmeter needle is of such nature as not to respond to charges of this amplitude one way or the other, it will, by maintaining its original position, indicate the average charge or discharge of the condenser. If this position of the needle is marked on the voltmeter in terms of percentage of break to make, an immediate indication of the operating characteristics of contacts 14 will be had even though a single cycle of operations of the contacts 14 may take place. These particular curves may be considered as representing a standard condition in which the percentage of break is 60% and percentage of make is 40% of a cycle of operations of the contacts 14, although these percentages are purely arbitrary.

By a further study of these curves it is readily seen that in case the percentages of break to make are of different proportions, for example, the break period is longer than 60% of the total period, the needle will move toward zero position away from the original average position or, if the make period is longer than 40% of the total period the needle will gradually move up beyond the original average position. The needle will thus indicate in each instance not only the percentage of error or deflection from the standard but also give an indication of the new position to which the needle should be set to receive an immediate correct reading of the operating characteristics of any particular pulsing contacts under test.

Fig. 3 illustrates an automatic starting circuit that may be substituted for the start key 22 and comprises relay 40 in the voltmeter circuit that does not operate during the operations of the starting circuit due to its inherent sluggishness in responding to short impulses of current but that operates before the interruptions begin or after they are completed to open the circuit for relay 21 at its armature and back contact. Thus, in a circuit where this arrangement is employed all that is necessary to set the device in operative condition is to operate key 16. Then, for example, if relay 40 operates before relay 20 has had time to become energized, it is evident that when the interruptions of contacts 14 begin, the circuit will function as in the case where the start key has been momentarily operated to cause this relay 21 to operate. On the other hand, if relay 20 operates before relay 21 has been energized sufficiently to operate the testing circuit will be closed at the left-hand armature and front contact thereof and consequently relay 40 will receive a current sufficient to cause its operation and thus attract its armature and open the circuit for relay 20 which in turn causes the operation of relay 21 and the circuit will then be in proper condition for proceeding with the test as before. Also, when the interruptions have ceased, relay 40 will operate causing the momentary release of relay 20 and operation of relay 21 so that the test may proceed as hereinbefore set forth. It is evident from this that by the use of relay 40 in a test circuit of this sort no resetting of the circuit is required at the end of a testing period as is necessary when the start key 21 only is employed.

The invention claimed is:

1. The method of measuring percentage of break to make in a circuit interrupting device consisting in establishing a certain potential in a circuit, disconnecting the means for establishing said potential, setting the interrupting device in operation, connecting it to the circuit in which the potential is established, and observing the change in said potential.

2. A method of measuring percentage of break to make in a circuit interrupting device consisting in establishing a standard potential in a circuit for comparison, simultaneously disconnecting the means for establishing said standard potential, setting the circuit interrupting device in operation and connecting the interrupting device in circuit with said standard established potential, and observing the change in said standard potential.

3. The method of measuring percentage of break to make in a circuit interrupting device which consists in charging a condenser to a certain standard, permitting a source of battery to influence said condenser in accordance with the percentage of break to make of the interrupting device and then observing the condition of the charge as compared with the standard.

4. A method of measuring percentage of break to make in a circuit interrupting device which consists in observing the quantity of electrical energy present after the interrupting device is set in operation as compared with a standard quantity of electrical energy.

5. A method of measuring percentage of break to make in a circuit interrupting device which consists in observing the charge present on a condenser after the interrupting device has been set in operation as compared with a standard charge originally present on the condenser.

6. The method of comparing the relation of the open and closed periods of a circuit, as determined by an interrupting device, with a relation that is known consisting in charging a condenser to a potential representing the known relation, then subjecting the condenser to charges or discharges in accordance with the relation determined by the interrupting device, measuring the average charge maintained on a condenser and comparing it with the known charge.

7. The method of comparing the relation of the open and the closed periods of a circuit interrupting device with a relation that is standard which consists of accumulating a certain quantity of electrical energy representing said standard relation, then subjecting said quantity of electrical energy to drains or additions in accordance with the relation determined by the interrupting device, and absorbing the average quantity of electrical energy accumulated.

8. In a system for measuring the percentage of break to make in an interrupting device including a condenser, means for establishing a standard charge on said condenser, and means for measuring charges on said condenser, the method of establishing the standard charged condition of the condenser consisting in connecting a circuit having a known potential to the condenser and disconnecting said circuit from the condenser when it is charged to said standard condition, and the method of observing changes in said charge caused by the operation of the interrupting device consisting in connecting a voltmeter across the terminals of said condenser.

9. A system for measuring the percentage of break to make in an interrupting device comprising a condenser, a circuit therefor, a balanced circuit, means for connecting the midpoint of said balanced circuit to the circuit for the condenser to establish a charge thereon coresponding to the potential at said midpoint, a circuit including a source of energy and said interrupting device, means for disconnecting the balanced circuit and connecting the circuit for the interrupting device to the condenser, and means for observing the change in the potential on said condenser during the operation of said interrupting device.

10. A system for measuring percentage of break to make in an interrpting device comprising a condenser, a circuit therefor including a resistance in series with the condenser, a balanced circuit including a source of energy and resistance, means for connecting a point in said balanced circuit representing a certain potential to the circuit for the condenser to establish a potential condition on said condenser corresponding to said certain potential, a circuit including said interrupting device and a source of energy, means for simultaneously disconnecting said balanced circuit and connecting the circuit including the interrupting device to said condenser circuit, and means for observing the difference between the originally established potential and that established by the circuit including the interrupting device when said device is operating.

11. A system for measuring percentage of break to make in a circuit for an interrupting device comprising a condenser, means for establishing a certain charge on said condenser normally connected thereto, a relay, means for operating said relay to simultaneously disconnect the charging means from the condenser and connecting the circuit for the interrupting device, and means for observing the difference between the original charge on the condenser and that established during the operation of said device.

12. A system for measuring percentage of break to make in a circuit for an interrupting device comprising a circuit including a condenser normally charged at a certain potential, means for comparing said charge with the charges produced by the operation of said interrupting device when the circuit therefor is connected to the condenser.

13. A system for measuring percentage of break to make in a circuit including an interrupting device comprising a condenser, means for establishing a certain charge on said condenser including a key for starting the establishing of a charge, means for transferring the charged condenser from said charging means to a circuit including the interrupting device comprising a battery, a relay and a key for causing the energization of said relay from said battery to effect said transfer, and means for observing the original charge on the condenser with that obtained by the circuit including the interrupting device when said device is operated.

14. A system for measuring percentage of break to make in a circuit caused by an interrupting device included therein comprising a condenser, means for establishing a certain charge on the condenser, means for transferring the condenser from said charging means to the circuit including an interrupting device, means for effecting said transfer when the interrupting device begins to operate, and means for observing the charges on the condenser caused by the interruptions as compared with the original charge thereon.

15. A system for measuring percentage of break to make in a circuit caused by an interrupting device comprising a condenser, means for establishing a certain charge on the condenser, a relay for removing said charging means from the condenser and connecting the circuit including the circuit interrupting device thereto, means included in the circuit for the interrupting device for controlling the operation of said relay to cause it to become energized when the interrupting device is first operated, means operated by said relay for removing said last mentioned means from control over said relay, and means for observing the effect of the operation of said circuit interrupting devices on the charged condition of said condenser.

16. A system for measuring percentage of break to make in a circuit caused by an interrupting device comprising a condenser, means for establishing a certain charge on the condenser, a relay for removing said charging means from the condenser and connecting the circuit including the circuit interrupting device thereto, means included in the circuit for the interrupting device for controlling the operation of said relay to cause it to become energized when the interrupting device is first operated, means operated by said relay for removing said last mentioned means from further control over said relay, means for observing the effect of the operation of said circuit interrupting device on the charged condition of said condenser, and means for releasing said relay to restore the controlling means therefor into circuit with the interrupting device, effective after an operation of said device has ceased.

17. A system for measuring percentage of break to make in a circuit caused by an interrupting device comprising a condenser, means for establishing a certain charge on the condenser, a relay for removing said charging means from the condenser and connecting the circuit including the circuit interrupting device thereto, means included in the circuit for the interrupting device for controlling the operation of said relay to cause it to become energized when the interrupting device is first operated, means operated by said relay for removing said last mentioned means from further control over said relay, means for releasing said relay to restore the controlling means therefor into circuit with the interrupting device operated automatically after the interrupting device has come to rest.

18. A system for measuring the percentage of break to make in a circuit caused by an interrupting device comprising a condenser normally charged at a certain potential and a voltmeter in parallel therewith for observing the charges present on the condenser after the interrupting device has begun to operate.

In witness whereof, I hereunto subscribe my name this 19th day of March A. D., 1924.

OHMER R. MILLER.